United States Patent
Hasegawa

(10) Patent No.: US 12,047,541 B2
(45) Date of Patent: Jul. 23, 2024

(54) IMAGE FORMING APPARATUS HAVING NORMAL MODE SWITCHING SETTING DURING SILENT MODE OPERATION

(71) Applicant: SHARP KABUSHIKI KAISHA, Sakai (JP)

(72) Inventor: Naoki Hasegawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/378,238

(22) Filed: Oct. 10, 2023

(65) Prior Publication Data

US 2024/0121347 A1    Apr. 11, 2024

(30) Foreign Application Priority Data

Oct. 11, 2022 (JP) ................. 2022-163218

(51) Int. Cl.
    *H04N 1/00* (2006.01)
(52) U.S. Cl.
    CPC . *H04N 1/00915* (2013.01); *H04N 2201/0094* (2013.01)
(58) Field of Classification Search
    CPC ................... H04N 1/00915; H04N 2201/0094
    USPC ....................................... 358/1.13
    See application file for complete search history.

(56) References Cited

U.S. PATENT DOCUMENTS

2014/0320904 A1* 10/2014 Ikebata ............ H04N 1/00
                                         358/1.15
2014/0321876 A1   10/2014 Asaka et al.
2018/0288258 A1* 10/2018 Judd ............... H04N 1/00307

FOREIGN PATENT DOCUMENTS

JP         2014-215458 A      11/2014

* cited by examiner

*Primary Examiner* — Allen H Nguyen
(74) *Attorney, Agent, or Firm* — ScienBiziP, P.C.

(57) ABSTRACT

An image forming apparatus includes: an image former that is switchable between a normal mode and a silent mode; a mode setter that accepts a setting; a job-reservation registration acceptor that accepts reservation registration of the jobs; and a controller, wherein, when the job-reservation registration acceptor accepts a reservation of a job in the normal mode, the controller determines whether or not a job last accepted by the job-reservation registration acceptor is a job in the silent mode, and when the job last accepted is a job in the silent mode, the controller causes the image former to pause the job being executed by the image former, changes all jobs accepted by the job-reservation registration acceptor to jobs in the normal mode, and accepts registration of a job in the normal mode as a final job.

5 Claims, 9 Drawing Sheets

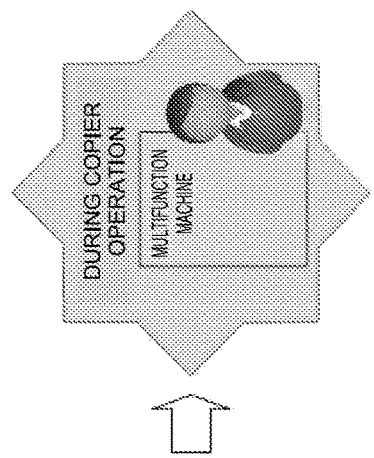
FIG. 9A
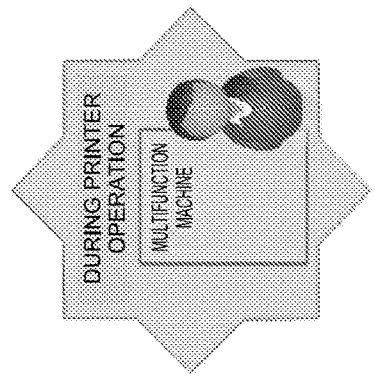
FIG. 9B
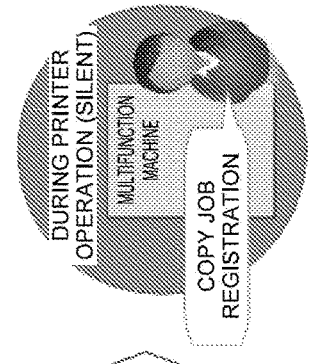
FIG. 9E
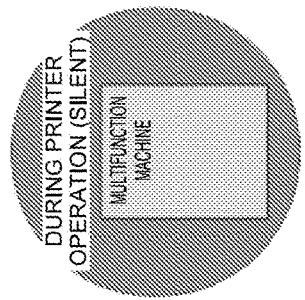
※ WAITING FOR COMPLETION OF PRINTER JOB POST-PROCESSING (STOP BETWEEN COMPONENTS)
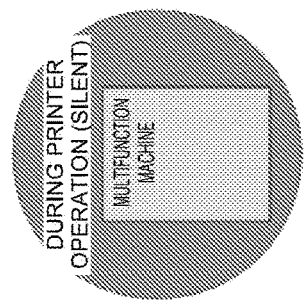
FIG. 9C
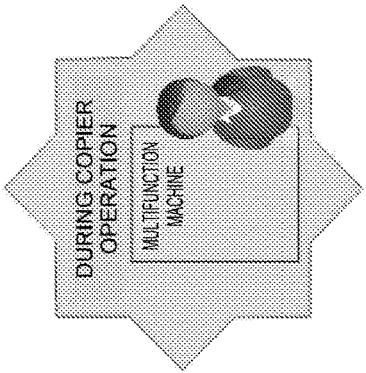
FIG. 9F
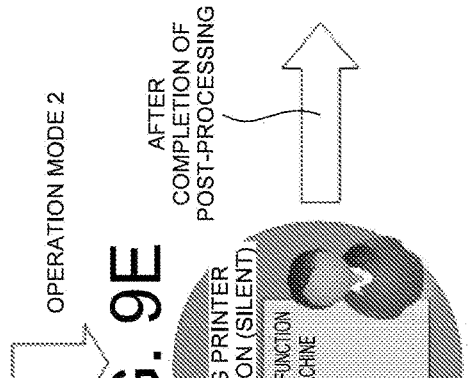
FIG. 9D
FIG. 9G

IMAGE FORMING APPARATUS HAVING NORMAL MODE SWITCHING SETTING DURING SILENT MODE OPERATION

CROSS-REFERENCE TO RELATED APPLICATION

The present application claims priority from Japanese Application JP2022-163218, the content to which is hereby incorporated by reference into this application.

BACKGROUND OF THE INVENTION

1. Field of the Invention

The disclosure relates to an image forming apparatus, and more particularly, to an image forming apparatus having a silent function.

2. Description of the Related Art

Conventionally, there has been known an image forming apparatus capable of switching between two image forming modes: a normal mode in which an image is formed at a predetermined normal motor speed and a silent mode in which an image is formed at a motor speed lower than the normal motor speed for the purpose of quietness.

Conventionally, there is known an image forming apparatus having such a silent mode, in which job execution modes of multiple types of functions are set and changed on a function basis, and only a job execution mode of a predetermined function among the multiple types of functions is set and changed to the silent mode in a state where all job execution modes of the multiple types of functions are set to the normal mode. Such an image forming apparatus reduces user's operations and improves user's convenience.

SUMMARY OF THE INVENTION

However, for example, when a copy job is set to the normal mode and a printer job is set to the silent mode, the copy job cannot be started until the printer job in the silent mode is finished even if a user wants to execute the copy job while the printer job is being executed.

In this case, the printer job in the silent mode operates at a motor speed lower than the normal motor speed, so there is a problem that the waiting time of the user until the start of the copy job becomes long.

An object of the disclosure, which has been made in view of the circumstances described above, is to provide an image forming apparatus that is capable of switching between two modes, i.e., a normal mode and a silent mode, has a waiting time of a user shorter than that in the in the past, and is highly convenient for the user.

An aspect of the disclosure provides an image forming apparatus including: an image former that is switchable between a normal mode and a silent mode, the normal mode being a mode in which an image is formed at a predetermined speed, the silent mode being a mode in which an image is formed at a speed lower than the normal mode; a mode setter that accepts a setting as to whether various jobs are to be executed in the normal mode or in the silent mode; a job-reservation registration acceptor that accepts reservation registration of the job; and a controller that controls the image former, the mode setter, and the job-reservation registration acceptor, wherein, when the job-reservation registration acceptor accepts a reservation of a job in the normal mode, the controller determines whether or not a job last accepted by the job-reservation registration acceptor is a job in the silent mode, and when the job last accepted is a job in the silent mode, the controller causes the image former to pause the job image former is executing, changes all jobs accepted by the job-reservation registration acceptor to jobs in the normal mode, and accepts registration of a job in the normal mode as a final job.

In the disclosure, "the image forming apparatus" is an apparatus that forms an image and outputs it, including a copying machine or a multifunction machine having a copying (copy function) function such as a printer using an electrophotographic method for image forming with toner, a multifunction peripheral (MFP) that also includes functions other than copying.

According to the disclosure, with an image forming apparatus that is switchable between a normal mode and a silent mode, when a job in the normal mode is reserved during execution of a job in the silent mode and after the job being executed is paused, all the reserved jobs are switched to the normal mode to register and start the jobs, so that the user's waiting time is shorter than in the past and the image forming apparatus having high user convenience can be provided.

BRIEF DESCRIPTION OF THE DRAWINGS

FIGS. 9A to 9G are diagrams illustrating an example of a job registration process in a normal mode during job execution in a silent mode of the digital multifunction machine according to the second embodiment.

DESCRIPTION OF THE PREFERRED EMBODIMENTS

Figure 1:
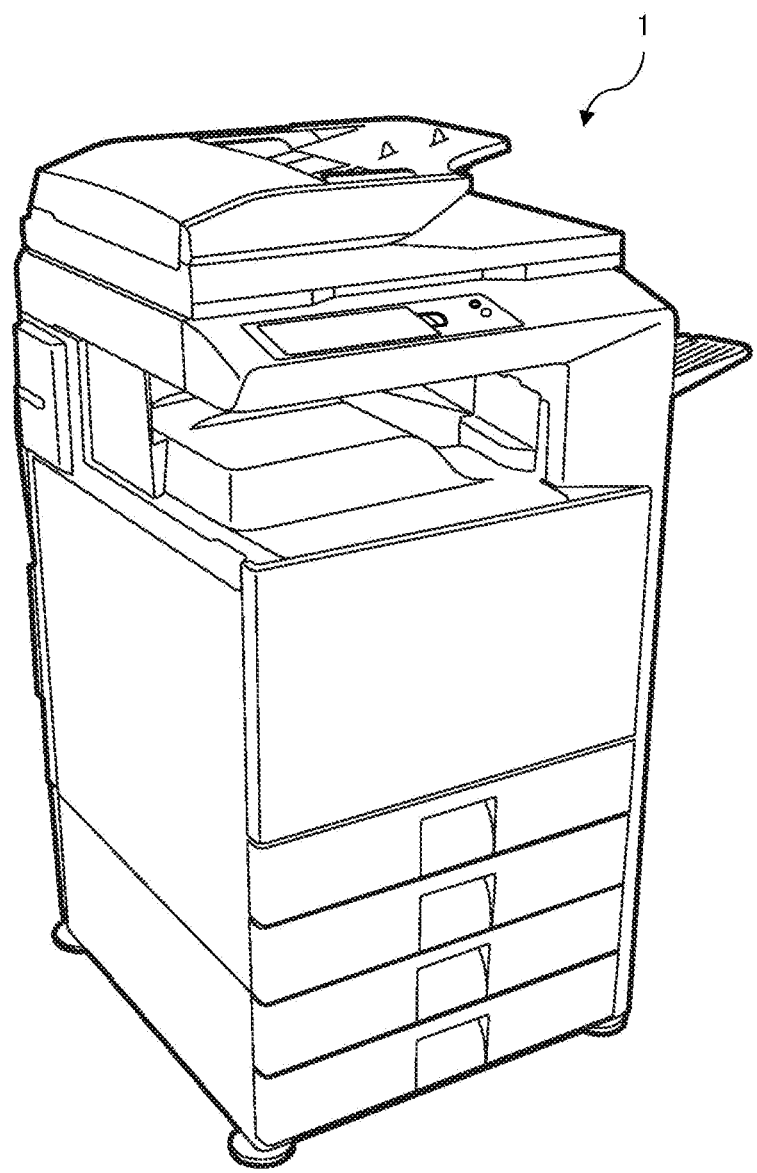
FIG. 1 is a perspective view of the exterior of a digital multifunction machine 1 according to a first embodiment of the disclosure.

Preferred modes of the disclosure are described below.

In an image forming apparatus according to the disclosure, the mode setter may further accept a setting of whether or not to enable operation cancellation in the silent mode through job reservation registration in the normal mode; when the job-reservation registration acceptor accepts a reservation of a job in the normal mode, the controller may determine whether or not a job last accepted by the job-reservation registration acceptor is a job in the silent mode; when the job last accepted by the job-reservation registration acceptor is a job in the silent mode, the controller may determine whether or not a setting for operation cancelation in the silent mode is enabled; and when the setting is enabled, the controller causes the image former to pause the job being executed by the image former, changes all jobs accepted by the job-reservation registration acceptor to jobs in the normal mode, and accepts registration of a job in the normal mode as a final job.

In this way, with an image forming apparatus that is switchable between a normal mode and a silent mode, when a job in the normal mode is reserved during execution of a job in the silent mode, the job being executed is paused on the basis on the setting of whether or not to enable operation cancelation in the silent mode with registration in the normal mode, and then by switching all the reserved jobs to the normal mode to determine whether or not to register and start the jobs, the image forming apparatus having high user convenience can be provided.

In the image forming apparatus according to the disclosure, the mode setter may further accept a setting of whether or not to enable operation interruption in the normal mode through job reservation registration in the normal mode; when the setting of operation cancellation in the silent mode is not enabled, the controller may determine whether or not the setting of operation interruption in the normal mode is enabled; and when an operation interruption setting in the normal mode is enabled, the controller may cause the image former to pause the job being executed by the image former, and the job-reservation registration acceptor may accept registration for causing the job in the normal mode to interrupt the job to be executed next.

In this way, with an image forming apparatus that is switchable between a normal mode and a silent mode, when a job in the normal mode is reserved during execution of a job in the silent mode and after the job being executed is paused, the reserved job is registered as an interrupt, and after the job is completed, the job in the silent mode is resumed, so that the user's waiting time is shorter than in the past and the image forming apparatus having high user convenience can be provided.

The image forming apparatus according to the disclosure may further include a post-processor that executes post-processing on the sheet on which the image is formed; when the operation interruption setting in the normal mode is enabled, the controller may determine whether or not post-processing is to be executed on the job being executed in the normal mode; and when the post-processing is to be executed, the controller may cause the image former to pause the job being executed by the image former after the post-processor executes the post-processing of the job being executed in the normal mode, and the job-reservation registration acceptor may accept registration for causing the job in the normal mode to interrupt the job to be executed next.

In this way, with an image forming apparatus that is switchable between a normal mode and a silent mode, when a job in the normal mode is reserved during execution of a job in the silent mode and after sheets are supplied until the next post-processing, a job pause process can be started to avoid a situation in which sheets are not stapled due to the interruption of sheets midway of the process, so that the image forming apparatus having user convenience higher than in the past can be provided.

In the image forming apparatus according to the disclosure, when the job being executed in the normal mode is not to be subjected to post-processing, the controller may cause the image former to pause the job being executed by the image former, and the job-reservation registration acceptor may accept registration for causing the job in the normal mode to interrupt the job to be executed next.

In this way, with an image forming apparatus that is switchable between a normal mode and a silent mode, when a job in the normal mode is reserved during execution of a job in the silent mode and sheets are supplied until the next post-processing depending on whether or not the job being executed is to be subjected to post-processing, and whether or not a job pause process is to be started is determined, so that the user's waiting time is shorter than in the past and the image forming apparatus having high user convenience can be provided.

The disclosure will now be described in more detail with reference to the accompanying drawings. The following description is illustrative in all respects and should not be construed as limiting the disclosure.

First Embodiment

Configuration of Digital Multifunction Machine 1

An outline of a configuration of a digital multifunction machine 1 as an example of an image forming apparatus according to Embodiment 1 of the present disclosure will now be described with reference to FIG. 1 and FIG. 2.

FIG. 1 is a perspective view illustrating external appearance of the digital multifunction machine 1 according to the first embodiment of the disclosure.

Figure 2:
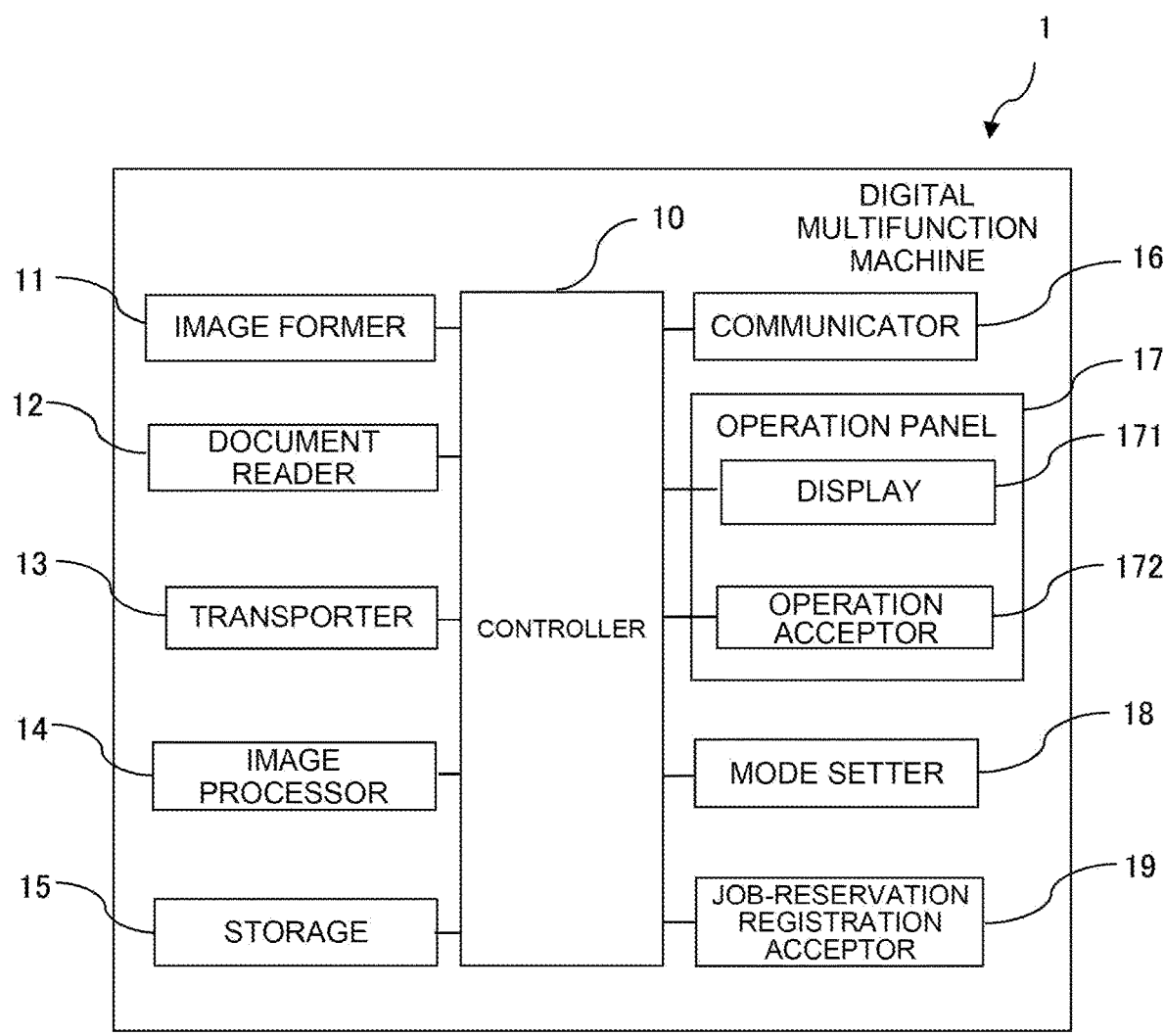
FIG. 2 is a block diagram illustrating a schematic configuration of the digital multifunction machine in FIG. 1.

FIG. 2 is a block diagram illustrating a schematic configuration of the digital multifunction machine 1 in FIG. 1.

The digital multifunction machine 1 has a copy function, a scanner function, and a facsimile function, and digitally processes image data read from a document and outputs the processed image data.

As illustrated in FIG. 2, the digital multifunction machine 1 includes a controller 10, an image former 11, a document reader 12, a transporter 13, an image processor 14, a storage 15, a communicator 16, an operation panel 17, a mode setter 18, and a job-reservation registration acceptor 19.

Each of the components of the digital multifunction machine 1 will now be described.

The controller 10 comprehensively controls the digital multifunction machine 1, and is composed of a CPU, a RAM, a ROM, various interface circuits, and the like.

In order to comprehensively control the operation of the digital multifunction machine 1, the controller 10 monitors and controls detection by each sensor and all loads such as the motor, the clutch, and the operation panel 17.

The image former 11 prints out image data generated by the image processor 14 on a sheet.

The image former 11 includes one or more motors for driving the image former 11, and can operate by switching between two image forming modes in accordance with the type of job: a normal mode in which an image is formed at a predetermined normal motor speed and a silent mode in which an image is formed at a motor speed lower than the normal motor speed for quietness.

The document reader 12 includes one or more motors for driving the document reader 12, and detects and reads a document placed on a document table or a document transported from a sheet tray to generate image data.

The transporter 13 includes one or more motors for driving the transporter 13, and transports a recording sheet stored in a sheet feed cassette or a manual feed tray to the image former 11 and outputs the recording sheet from a sheet output tray.

In an automatic reading mode, the transporter 13 sequentially transports the documents placed on a document stacking tray one by one onto a document table of the document reader 12.

The image processor 14 converts the image of the document read by the document reader 12 into an appropriate electrical signal so as to generate image data.

The storage 15 is an element or a storage medium that stores information required to realize the various functions of the digital multifunction machine 1, control programs, and the like. For example, the storage 15 is composed of a semiconductor device, such as a RAM or a ROM, or a storage medium, such as a hard disk, a flash storage, or an SSD.

Note that a program and data may be held in different devices, such as that an area for holding the data is configured by a hard disk drive, and an area for holding the program is configured by a flash storage.

The communicator 16 communicates with a computer, a mobile information terminal, an external information processing device, a facsimile machine, etc., via a network or the like, and transmits and receives various kinds of information including mail and facsimile to and from such external communication devices.

The operation panel 17 displays various kinds of information and accepts an instruction from a user through a touch panel function.

The operation panel 17 includes a display panel including a liquid crystal panel, a touch panel that overlaps with the display panel and employs a capacitive method or the like to detect a position touched by a finger. The operation panel 17 also includes a display 171 and an operation acceptor 172.

The display 171 is composed of, for example, a CRT display, a liquid crystal display, an EL display, or the like and is a display device such as a monitor, a line display, or the like for an operating system or application software to display electronic data such as a processing state. The controller 10 displays, through the display 171, the operation and status of the digital multifunction machine 1.

The operation acceptor 172 is an interface for operating the digital multifunction machine 1, and accepts a command from a user.

The mode setter 18 accepts a setting as to whether various jobs should be executed in the normal mode or in the silent mode.

The job-reservation registration acceptor 19 accepts reservation registration of a job.

Figure 3:
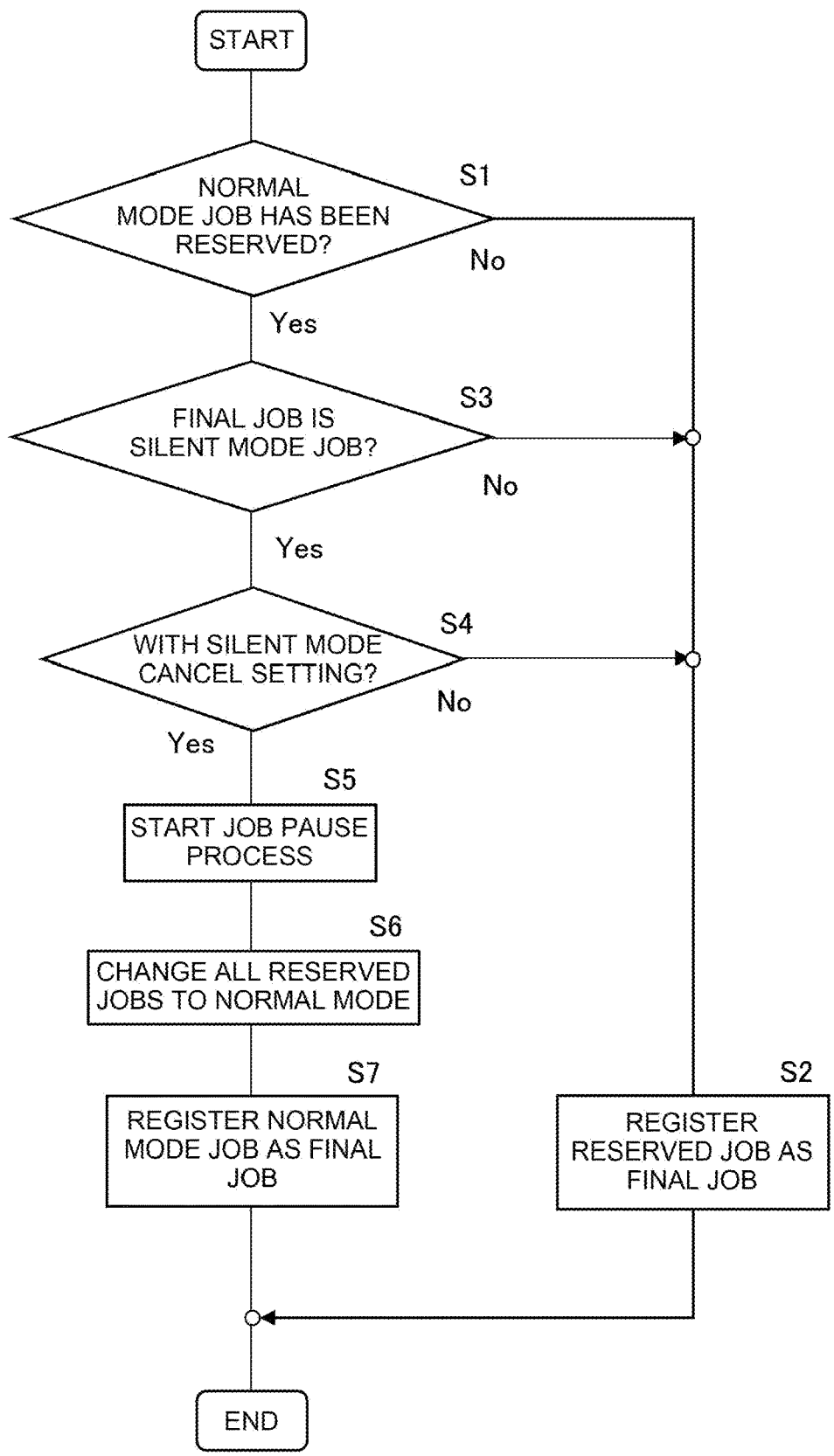
FIG. 3 is a flowchart illustrating an example of a job registration process in a normal mode during execution of a job in a silent mode of the digital multifunction machine in FIG. 1.

Job Registration Process in Normal Mode During Job Execution in Silent Mode of Digital Multifunction Machine 1 According to First Embodiment FIG. 3 is a flowchart illustrating an example of a job registration process in the normal mode during execution of a job in the silent mode of the digital multifunction machine 1 in FIG. 1.

In step S1 of FIG. 3, the controller 10 of the digital multifunction machine 1 determines whether or not a job in the normal mode has been reserved (step S1).

If a job in the normal mode is not reserved (No in step S1), the controller 10 registers the reserved job as the final job in step S2 (step S2), and then the process ends.

Meanwhile, if a job in the normal mode is reserved (Yes in step S1), the controller 10 determines whether or not the final job is a job in the silent mode in step S3 (step S3).

If the final job is not a job in the silent mode (No in step S3), the controller 10 registers the reserved job as the final job in step S2 (step S2), and then the process ends.

Meanwhile, when the final job is a job in the silent mode (Yes in step S3), the controller 10 determines whether or not the normal mode switching setting that is being executed in the silent mode is set to a silent mode cancel setting in step S4 (step S4).

Figure 4:
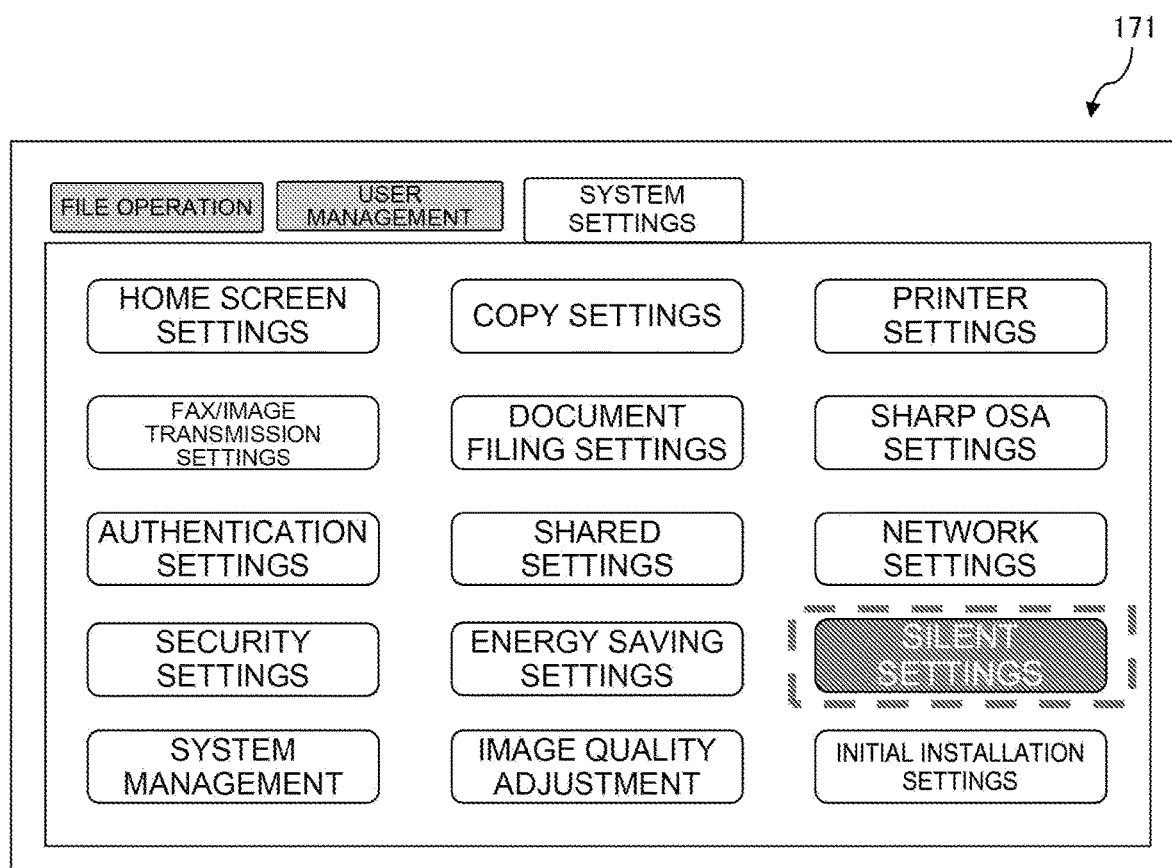
FIG. 4 is an example of a system setting screen displayed on a display of the digital multifunction machine in FIG. 1.

FIG. 4 is an example of a system setting screen displayed on the display 171 of the digital multifunction machine 1 in FIG. 1.

As illustrated in FIG. 4, a user can establish the silent setting by selecting the "silent setting" item of the system setting.

Figure 5:
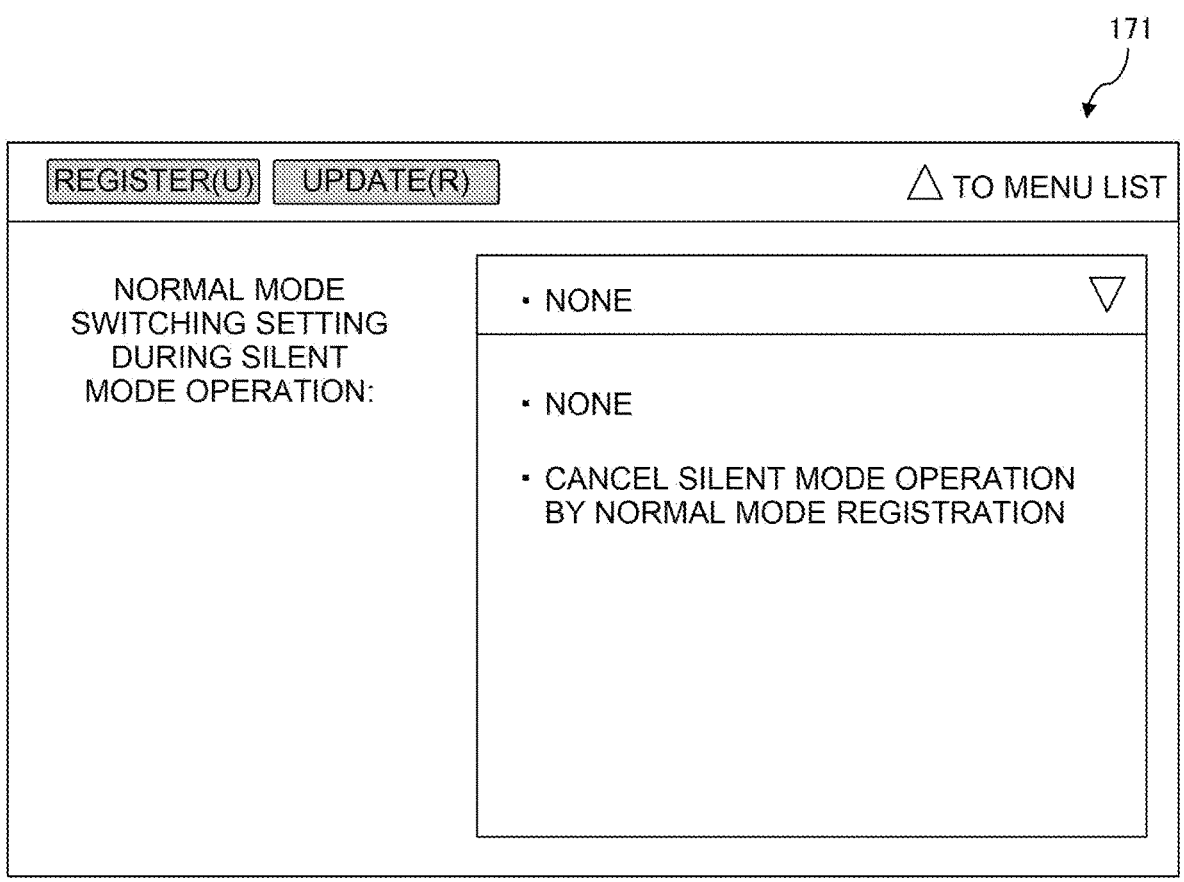
FIG. 5 is an example of a normal mode switching setting displayed on the display of the digital multifunction machine in FIG. 1 and being executed in the silent mode.

FIG. 5 is an example of the normal mode switching setting displayed on the display 171 of the digital multifunction machine 1 in FIG. 1 and being executed in the silent mode.

As illustrated in FIG. 5, a user selects either "none" or "cancel operation of silent mode in normal mode registration" as the normal mode switching setting during execution in the silent mode.

In step S4 in FIG. 3, if the normal mode switching setting being executed in the silent mode is not set to "cancel operation of silent mode in normal mode registration" (No in step S4), the controller 10 registers the reserved job as the final job in step S2 (step S2), and then the process ends.

Meanwhile, when the normal mode switching setting being executed in the silent mode is set to "cancel operation of silent mode in normal mode registration" (Yes in step S4), the controller 10 starts a job pause process in step S5 (step S5).

Next, in step S6, the controller 10 changes all the reserved jobs to the normal mode (step S6).

Next, in step S7, the controller 10 registers a job in the normal mode as the final job (step S7), and then the process ends.

In this way, when a copy job in the normal mode is reserved during the execution of a printer job in the silent mode and after the job in execution is paused, all the reserved jobs are switched to the normal mode, the copy job is registered, and the job is started.

Accordingly, the mode can be switched to the normal mode faster than when the mode is switched to the normal mode after the job being executed is completed, and it is possible to provide the digital multifunction machine 1 having a shorter waiting time for a user than in the past, which is highly convenient for the user.

Job Registration Process in Normal Mode During Job Execution in Silent Mode of Digital Multifunction Machine 1 According to Second Embodiment A job registration process of the normal mode during execution of a job in the silent mode of the digital multifunction machine 1 according to the second embodiment of the disclosure will now be described with reference to FIGS. 6 to 9.

Figure 6:
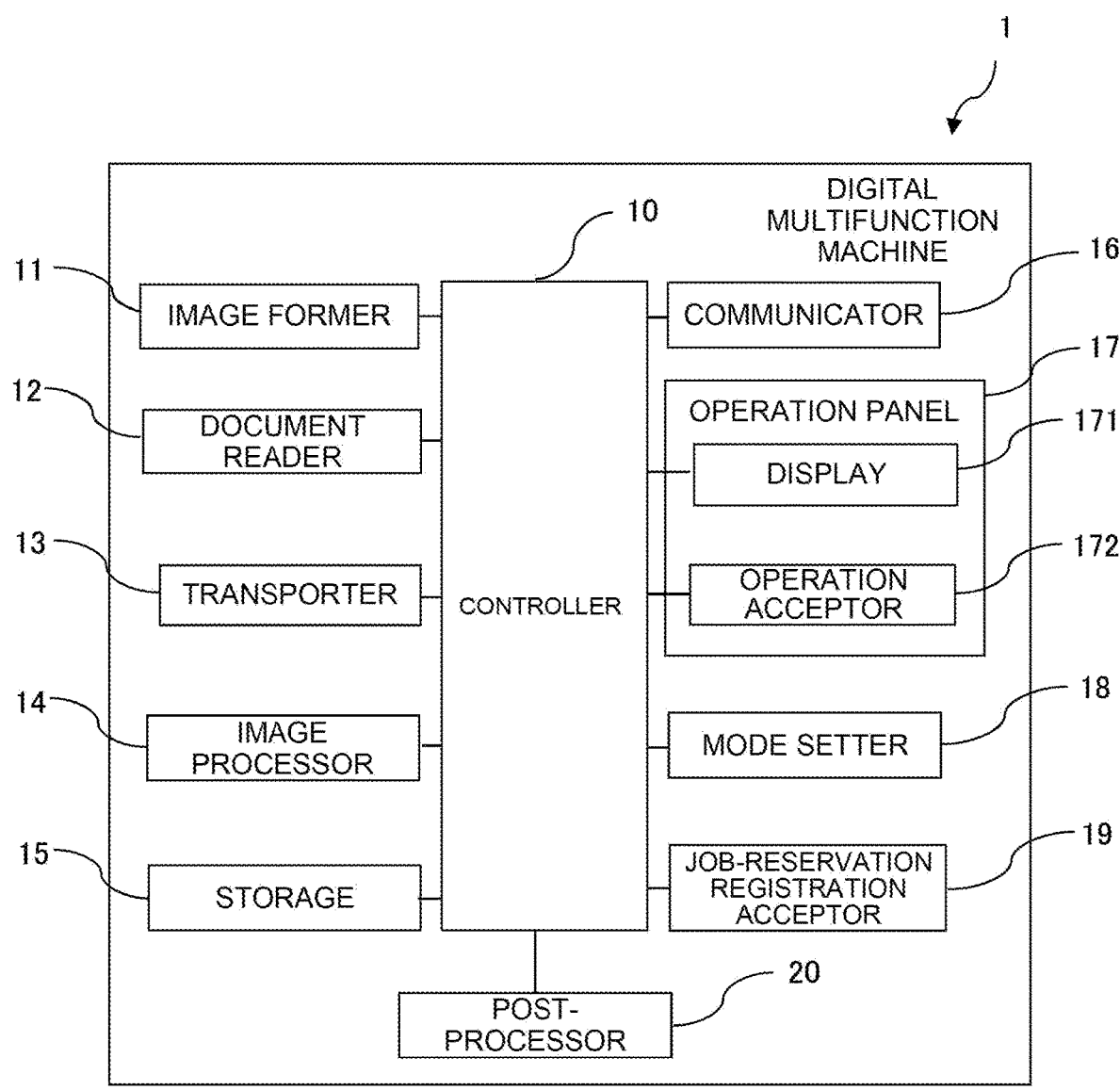
FIG. 6 is a block diagram illustrating a schematic configuration of a digital multifunction peripheral according to a second embodiment of the disclosure.

FIG. 6 is a block diagram illustrating a schematic configuration of the digital multifunction machine 1 according to a second embodiment of the disclosure.

The schematic configuration of the digital multifunction machine 1 according to the second embodiment of the disclosure is the same as that of the first embodiment (FIG. 2) except that the digital multifunction machine 1 further includes a post-processor 20 that executes post-processing such as stapling of sheets on which images are formed by the image former 11.

In the first embodiment, the job reserved later is only registered as the final job. However, in the second embodiment, it is assumed that the job reserved later can be registered as an interrupt.

Figure 7:
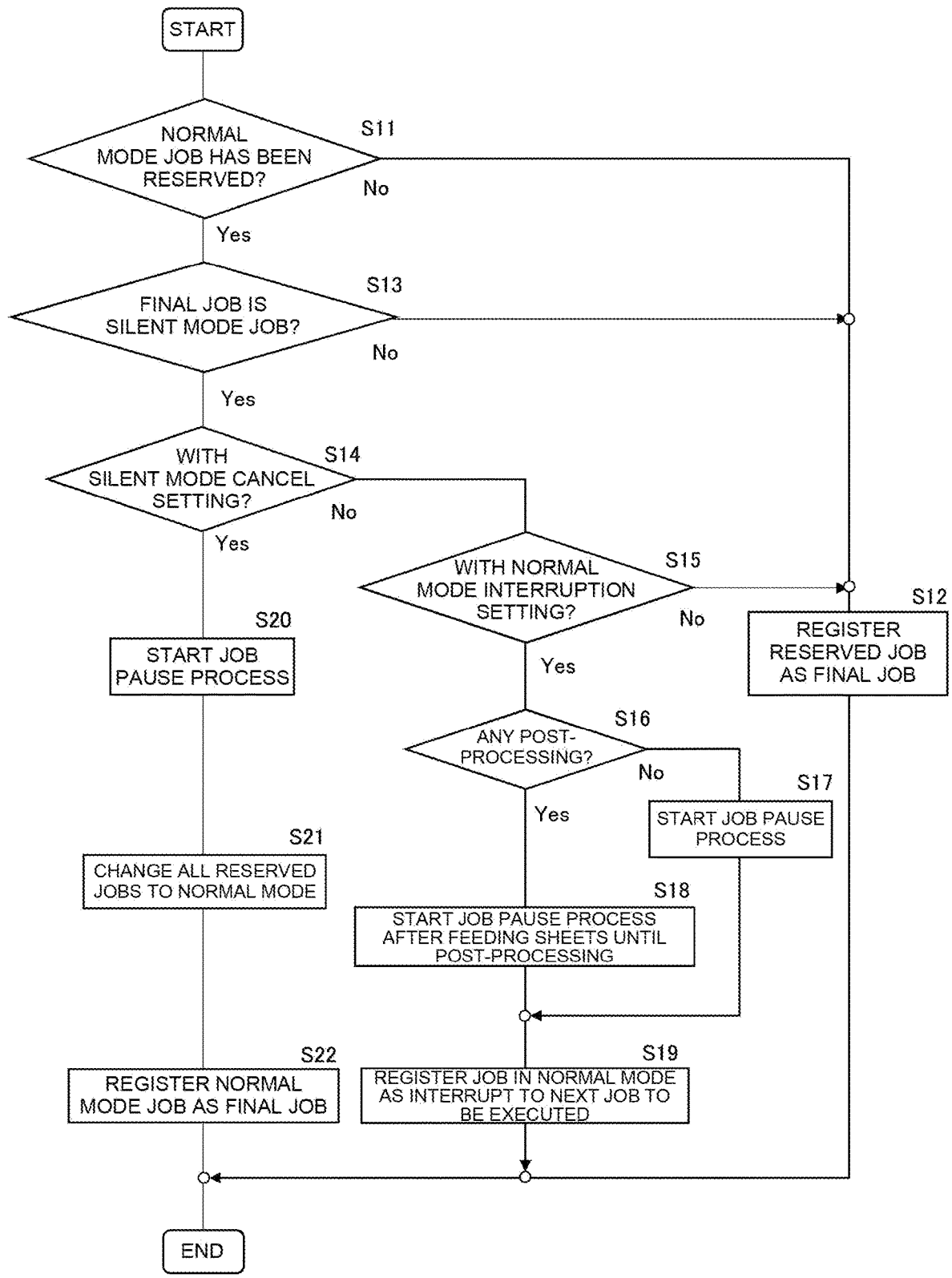
FIG. 7 is a flowchart illustrating an example of a job registration process in a normal mode during execution of a job in a silent mode of the digital multifunction machine according to the second embodiment.

FIG. 7 is a flowchart illustrating an example of a job registration process in the normal mode during execution of a job in the silent mode of the digital multifunction machine 1 according to the second embodiment.

In step S11 of FIG. 7, the controller 10 of the digital multifunction machine 1 determines whether or not a job in the normal mode has been reserved (step S11).

If a job in the normal mode is not reserved (No in step S11), the controller 10 registers the reserved job as the final job in step S12 (step S12), and then the process ends.

Meanwhile, if a job in the normal mode is reserved (Yes in step S11), the controller 10 determines whether or not the final job is a job in the silent mode in step S13 (step S13).

If the final job is not a job in the silent mode (No in step S13), the controller 10 registers the reserved job as the final job in step S12 (step S12), and then the process ends.

Meanwhile, when the final job is a job in the silent mode (Yes in step S13), the controller 10 determines whether or not the normal mode switching setting that is being executed in the silent mode is set to a silent mode cancel setting in step S14 (step S14).

Figure 8:
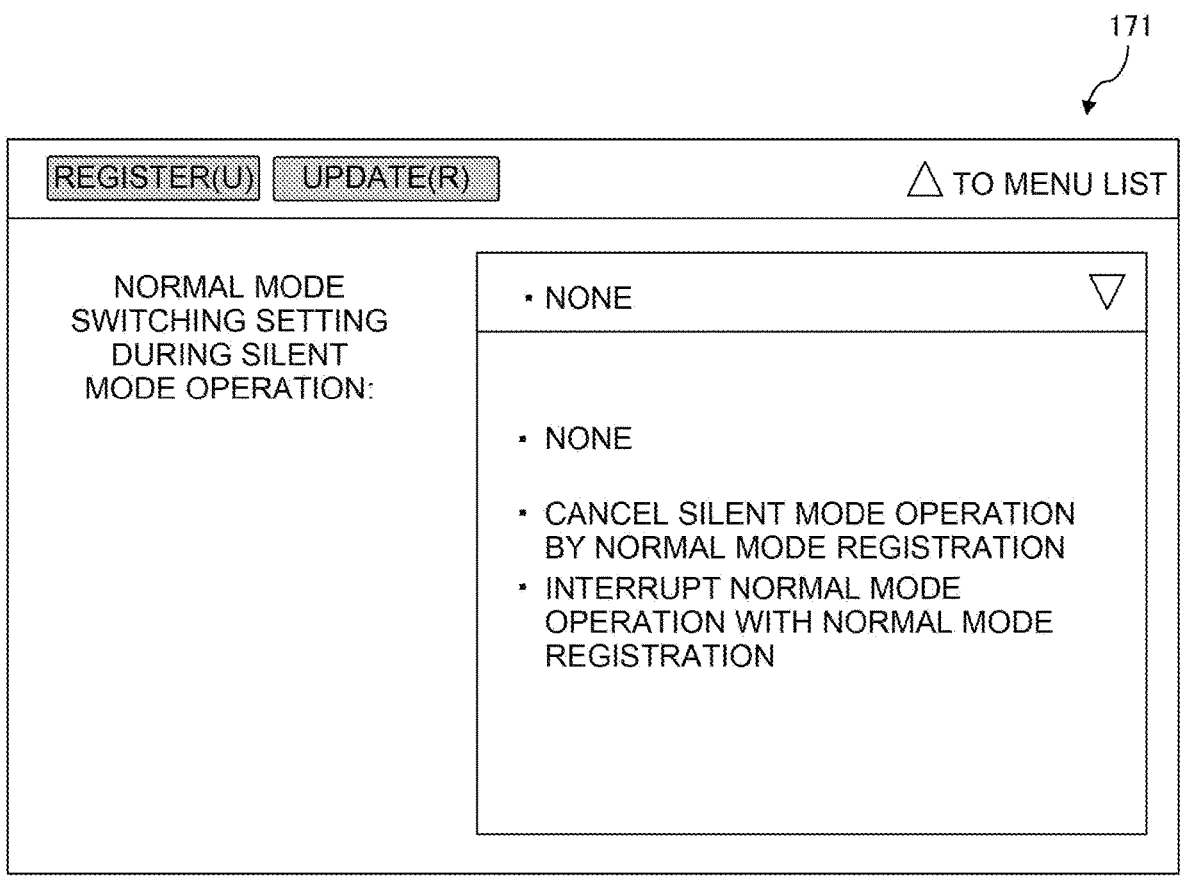
FIG. 8 is an example of a normal mode switching setting displayed on the display of the digital multifunction machine according to the second embodiment of the disclosure and being executed in the silent mode.

FIG. 8 is an example of a normal mode switching setting displayed on the display 171 of the digital multifunction machine 1 according to the second embodiment of the disclosure and being executed in the silent mode.

As illustrated in FIG. 8, a user selects either "none," "cancel operation of silent mode in normal mode registration," or "interrupt normal mode operation with normal mode registration" as the normal mode switching setting during execution in the silent mode.

In step S14 of FIG. 7, if the normal mode switching setting being executed in the silent mode is not set with operation cancelation in the silent mode (No in step S14), the controller 10 determines whether or not the normal mode switching setting being executed in the silent mode is set with operation interruption in the normal mode in step S15 (step S15).

If the normal mode switching setting being executed in the silent mode is not set with operation interruption in the normal mode (No in step S15), the controller 10 registers the reserved job as the final job in step S12 (step S12), and then the process ends.

Meanwhile, if the normal mode switching setting during the execution in the silent mode is set with operation interruption in the normal mode (Yes in step S15), the controller 10 determines whether or not there is post-processing for the job being executed in step S16 (step S16).

If there is no post-processing for the job being executed (No in step S16), the controller 10 starts the job pause process in step S17 (step S17).

Next, the controller 10 registers the reserved job in the normal mode as an interrupt to a job to be executed next in step S19 (step S19), and the process ends.

Meanwhile, if there is post-processing for the job being executed (Yes in step S16), the controller 10 performs sheet feeding until the next post-processing for the job being executed, and then starts the job pause process in step S18 (step S18).

For example, if a job in which post-processing such as binding printed sheets with a staple is performed, the job pause process is executed at the timing when the post-processing is completed after the sheets for one bundle to be bound with the staple are printed.

In this way, by starting the job pause process after the sheet feeding is performed until the next post-processing, it is possible to avoid a situation in which the sheets are not stapled due to the interruption of sheets midway of the process.

Next, the controller 10 registers the job in the normal mode as an interrupt to a job to be executed next in step S19 (step S19), and the process ends.

Meanwhile, if the normal mode switching setting being executed in the silent mode is set to "with silent mode cancel setting" in step S14 (Yes in step S14), the controller 10 starts a job pause process in step S20 (step S20).

Next, in step S21, the controller 10 changes all the reserved jobs to the normal mode (step S21).

Next, in step S22, the controller 10 registers a job in the normal mode as the final job (step S22), and then the process ends.

FIGS. 9A to 9G are diagrams illustrating an example of a job registration process in the normal mode during job execution in the silent mode of the digital multifunction machine 1 according to the second embodiment.

In the example of FIGS. 9A to 9G, it is assumed that a copy job is set to the normal mode and a printer job is set to the silent mode. It is also assumed that the printer job includes post-processing.

There are an operation mode 1 (with silent mode cancel setting) and an operation mode 2 (with operation interruption in the normal mode).

It is assumed that while the printer job is being executed in the silent mode (FIG. 9A), a user registers a copy job in the normal mode (FIG. 9B).

Here, when the normal mode switching setting being executed in the silent mode is set to the operation mode 1, the controller 10 immediately executes a pause process of the printer job and then changes the mode to the normal mode (FIG. 9C).

Next, the controller 10 registers the copy job in the normal mode as the final job, and operates the registered copy job after the end of the printer job (FIG. 9D).

Meanwhile, when the normal mode switching setting being executed in the silent mode is set to the operation mode 2, the controller 10 waits for the completion of the post-processing of the printer job (FIG. 9E).

After the post-processing of the printer job has been completed, the controller 10 pauses the printer job, registers the registered copy job as an interrupt to the next job, and then starts the copy job (FIG. 9F).

After the copy job registered as an interrupt has been completed, the controller 10 restarts the printer job (FIG. 9G).

In this way, when a copy job in the normal mode is reserved during the execution of a printer job in the silent mode, the copy job is registered as interrupt after the job in execution has been paused, and the printer job in the silent mode is restarted after the copy job has been completed.

Therefore, by pausing the printer job in the normal mode in which priority is not given to the completion speed of the job from the beginning and giving priority to a copy job, it is possible to provide the digital multifunction machine 1 in which the user's waiting time is shorter than in the past and which is highly convenient for the user.

Preferred embodiments of the disclosure also include those obtained by combining any of the plurality of embodiments described above.

Various modifications can be made to the disclosure in addition to the above-described embodiments. The modifications should not be construed as falling outside the scope of the disclosure. The present disclosure is embodied by the claims and their equivalents, and should embrace all modifications within the scope of the claims.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image forming apparatus comprising:
   an image former that is switchable between a normal mode and a silent mode, the normal mode being a mode in which an image is formed at a predetermined speed, the silent mode being a mode in which an image is formed at a speed lower than the normal mode;
   a mode setter that accepts a setting as to whether various jobs related to image forming are to be executed in the normal mode or in the silent mode;
   a job-reservation registration acceptor that accepts reservation registration of the jobs; and
   a controller that controls the image former, the mode setter, and the job-reservation registration acceptor, wherein,
   when the job-reservation registration acceptor accepts a reservation of a job in the normal mode, the controller determines whether or not a job last accepted by the job-reservation registration acceptor is a job in the silent mode, and
   when the job last accepted is a job in the silent mode, the controller causes the image former to pause the job being executed by the image former, changes all jobs accepted by the job-reservation registration acceptor to jobs in the normal mode, and accepts registration of a job in the normal mode as a final job.

2. The image forming apparatus according to claim 1, wherein,
   the mode setter further accepts a setting of whether or not to enable operation cancellation in the silent mode through job reservation registration in the normal mode,
   when the job-reservation registration acceptor accepts a reservation of a job in the normal mode, the controller determines whether or not a job last accepted by the job-reservation registration acceptor is a job in the silent mode,
   when the job last accepted by the job-reservation registration acceptor is a job in the silent mode, the controller determines whether or not a setting for operation cancelation in the silent mode is enabled, and
   when the setting is enabled, the controller causes the image former to pause the job being executed by the image former, changes all jobs accepted by the job-reservation registration acceptor to jobs in the normal mode, and accepts registration of a job in the normal mode as a final job.

3. The image forming apparatus according to claim 2, wherein,
   the mode setter further accepts a setting of whether or not to enable operation interruption in the normal mode through job reservation registration in the normal mode,
   when the setting of operation cancellation in the silent mode is not enabled, the controller determines whether or not the setting of operation interruption in the normal mode is enabled, and
   when the operation interruption setting in the normal mode is enabled, the controller causes the image former to pause the job being executed by the image former, and the job-reservation registration acceptor accepts registration for causing the job in the normal mode to interrupt the job to be executed next.

4. The image forming apparatus according to claim 3, further comprising a post-processor that executes post-processing on the sheet on which the image is formed, wherein,
   when the operation interruption setting in the normal mode is enabled, the controller determines whether or not post-processing is to be executed on the job being executed in the normal mode, and
   when the post-processing is to be executed, the controller causes the image former to pause the job being executed by the image former after the post-processor executes the post-processing of the job being executed in the normal mode, and the job-reservation registration acceptor accepts registration for causing the job in the normal mode to interrupt the job to be executed next.

5. The image forming apparatus according to claim 4, wherein when the job being executed in the normal mode is not to be subjected to post-processing, the controller causes the image former to pause the job being executed by the image former, and the job-reservation registration acceptor accepts registration for causing the job in the normal mode to interrupt the job to be executed next.

* * * * *